US009935918B2

(12) United States Patent
Thomassian et al.

(10) Patent No.: US 9,935,918 B2
(45) Date of Patent: Apr. 3, 2018

(54) CLOUD-BASED INFRASTRUCTURE FOR DETERMINING REACHABILITY OF SERVICES PROVIDED BY A SERVER

(71) Applicant: Apple Inc., Cupertino, CA (US)

(72) Inventors: Jonathan D. Thomassian, Cupertino, CA (US); Jeffrey H. Michaud, Foster City, CA (US); Sathish K. Narayanaswamy, Sunnyvale, CA (US); Jason Allen Townsend, Cupertino, CA (US); Amul Goswamy, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 474 days.

(21) Appl. No.: 14/292,754

(22) Filed: May 30, 2014

(65) Prior Publication Data

US 2015/0350044 A1  Dec. 3, 2015

(51) Int. Cl.
*H04L 12/26* (2006.01)
*H04L 29/12* (2006.01)

(52) U.S. Cl.
CPC ...... *H04L 61/1511* (2013.01); *H04L 61/1541* (2013.01); *H04L 61/2514* (2013.01)

(58) Field of Classification Search
CPC .................. H04L 43/0817; H04L 61/1511
See application file for complete search history.

(56) References Cited

U.S. PATENT DOCUMENTS

| 2002/0083342 A1* | 6/2002 | Webb .................. G06F 21/31 726/12 |
| 2012/0324094 A1* | 12/2012 | Wyatt .................. H04W 4/003 709/224 |
| 2013/0124685 A1* | 5/2013 | Keitel ................. H04L 63/0272 709/218 |
| 2013/0263280 A1* | 10/2013 | Cote ...................... G06F 21/62 726/26 |
| 2013/0318239 A1* | 11/2013 | Scharf .................... H04L 69/16 709/224 |
| 2015/0222627 A1* | 8/2015 | Le Scouarnec ..... H04L 67/2814 726/10 |
| 2015/0295899 A1* | 10/2015 | Chen .................. H04L 63/0428 713/160 |

* cited by examiner

*Primary Examiner* — Yemane Mesfin
*Assistant Examiner* — Henry Baron
(74) *Attorney, Agent, or Firm* — Fish & Richardson P.C.

(57) ABSTRACT

Technologies are described for using a cloud-based computer system to access services provided by a particular server over public Internet Protocol (IP) connections. In one aspect, a system includes a first computer system configured to run the particular server to provide a first service over public IP connections; and a second computer system configured to run a second server, where the particular server transmits, over public IP connections, a request for the second server to check the first service, where, responsive to receipt of the request for the second server to check the first service, the second server provides, to the particular server over public IP connections, information relating to whether the first service is available over public IP connections, and where the particular server updates an availability status of the first service over public IP connections based on the information provided by the second server.

24 Claims, 8 Drawing Sheets

CLOUD-BASED INFRASTRUCTURE FOR DETERMINING REACHABILITY OF SERVICES PROVIDED BY A SERVER

TECHNICAL FIELD

The disclosure generally relates to determining reachability of services provided by a particular server over public Internet Protocol (IP) connections, for example, to using a cloud-based computer system to access the services provided by the particular server over public IP connections.

BACKGROUND

Computing devices, e.g., smart phones, MP3 players, laptops, workstations, that are connected to each other form a network. Networks are often configured as private networks, such that members of a private network have private IP addresses. In this manner, computing devices outside of the private network cannot communicate directly to the members of the private network. Such private networks are also referred to as local area networks (LAN). At least one of the members of the private network, e.g., a server computing system, is often configured with both private and public IP addresses. In this manner, devices outside of the private network can communicate directly to the server computer system of the private network that also has a public IP address. In this example, although the server computing system that has both private and public IP addresses is a member of the private network, it is also a member of a public network, e.g., the Internet.

As such, a server computer system is often configured to provide a first set of services to "internal" clients (e.g., to computing devices that communicate with the server computer system using corresponding private IP addresses), and a second, typically smaller set of services to "external" clients (e.g., to computing devices that communicate with the server computer system using corresponding public IP addresses.)

SUMMARY

In accordance with the disclosed technologies, a cloud-based infrastructure (e.g., Apple Inc.'s iCloud®) is used for determining reachability of services provided by a particular server (e.g., OS X Server®) over a public network. For instance, a computer system of the cloud-based infrastructure includes a server referred to as a reachability server. The reachability server is configured to check/confirm services provided by the particular server over public IP connections in the following manner.

The particular server sends to the reachability server requests to check services expected to be provided by the particular server over public IP connections. For example, such requests can be for checking (i) hostnames and/or corresponding public IP addresses associated with the particular server that should be accessible to potential external clients, (ii) availability of a given port of the particular server that should be open for the potential external clients, etc. Here, potential external clients of the particular server are those computing devices that would connect with the particular server via public IP connections, in contrast to internal clients which are computing devices that connect with the particular server via private IP connections. In some implementations, in response to receiving such a request, the reachability server connects to the service(s) referenced by the request and indicates a range of public IP addresses associated with the reachability server (e.g., subnet 17. or a specific address) from where the reachability server will perform the requested check. After receiving the range of public IP addresses from where the check is to be performed, the particular server listens for connection requests transmitted by the reachability server from the range of public IP addresses. In this manner, the particular server determines that the checked service(s) is(are) available over a public network (e.g., the Internet) if a request to connect to the checked service(s) transmitted from the range of public IP addresses is received by the particular server within a predetermined time interval, or unavailable otherwise. Advantageously, the cloud-based infrastructure that checks the service(s) provided by the particular server is purposely not being informed of the results of the check: as such, the reachability server cannot connect to some random server to fake/pretend that it checks services provided by the other server; instead, the reachability server securely connects, from the range of public IP addresses, to ports/services of only the particular server that requested the test.

In general, one aspect of the subject matter described in this specification can be implemented in a system that includes a first computer system configured to run a first server, the first server to provide a first service over public IP connections; and a second computer system configured to run a second server. The first server transmits, over public IP connections, a request for the second server to check the first service. Responsive to receipt of the request for the second server to check the first service, the second server provides, to the first server over public IP connections, information relating to whether the first service is available over public IP connections. Additionally, the first server updates an availability status of the first service over public IP connections based on the information provided by the second server.

The foregoing and other implementations can each optionally include one or more of the following features, alone or in combination. In some implementations, to provide the information relating to whether the first service is available over public IP connections, the second server (i) provides, to the first server over public IP connections, a range of public IP addresses from which the second server is to connect to the first service, and (ii) transmits, to the first server from the range of public IP addresses, a request for connection to the first service. Additionally, the first server updates the availability status of the first service over public IP connections based on whether the request to connect to the first service is received from the range of public IP addresses at the first service within a predetermined time interval. Here, the predetermined time interval is counted from receipt by the first server of the range of public IP addresses from the second server.

Further, the availability status of the first service over public IP connections is updated without transmitting, by the first server over public IP connections to the second server, an acknowledgment as to whether the request to connect to the first service transmitted by the second server was received at the first service. Furthermore, upon the receipt by the first server of the range of public IP addresses from the second server, the first server starts listening for the request to connect to the first service from the range of public IP addresses. In addition, availability status of the first service is updated to available over IP connections if the request to connect to the first service from the range of public IP addresses is received at the first service within the predetermined time interval, or to unavailable otherwise.

In some implementations, transmissions over public IP connections between the first and second servers are performed in accordance with a transmission control protocol (TCP), and the request to connect to the first service is transmitted as a SYN TCP packet. In some implementations, the range of public IP addresses can include a subnet associated with the second server. For instance, the range of public IP addresses can include a particular IP address associated with the second server.

In some implementations, the request for the second server to check the first service can be repeatedly transmitted by the first server over public IP connections to the second server. In some cases, a frequency of transmissions of the request for the second server to check the first service is less than a predetermined frequency. In some cases, the first server stops repetition of transmissions of the request for the second server to check the first service in response to input from a user of the first computer system.

In some implementations, the request for the second server to check the first service can include identification of a first port of the first server over which the first service is to be provided over public IP connections. Here, the request to connect to the first service is transmitted by the second server from the range of public IP addresses to the first port of the first server and represents the information relating to whether the first service is available over public IP connections. Further, the first server determines whether the first port is open based on whether the request to connect to the first service is received at the first port from the range of public IP addresses within the predetermined time interval. Additionally, the availability status of the first service over the Internet is updated based on whether the first port is open.

In some such cases, the second server can transmit, from the range of public IP addresses to a second port of the first server, a request for connection to a second service, the second service to be provided by the first server at the second port over private IP connections. Here, the first server determines whether the second port is open based on whether the request to connect to the second service is received at the second port from the range of public IP addresses within the predetermined time interval. In addition, an unintended availability status of the second service can be updated based on whether the second port is open. For example, the second server selects the second port of the first server from a set of predefined ports specified by the first server. As another example, the second port of the first server is selected by the second server from a set of ports aggregated by the second server based on trends over previous requests from the first server and/or from other servers similar to the first server.

The request for the second server to check the first service can include—in addition to the identification of the first port identifier—information relating to an initial data packet to be transmitted from the first service. Further, responsive to receipt of the request to connect to the first service at the first port from the range of public IP addresses, the first server transmits, over public IP connections to the second server, an acknowledgement indicating that connection with the first service at the first port has been established.

In some implementations, the second server determines whether the available first service provided over public IP connections at the first port functions properly based on whether the acknowledgement received from the first server correlates with the initial packet to be transmitted from the first service. Here, responsive to determining that the available first service provided over public IP connections at the first port functions improperly, the second server transmits the negative determination to the first server.

In other implementations, the second server returns back to the first port from the range of public IP addresses the received acknowledgement, and the first server determines proper functionality of the first service over public IP connections at the first port based on whether the returned acknowledgement correlates with the initial data packet to be transmitted from the first service.

In some implementations, the request for the second server to check the first service can include (i) a hostname associated with the first server used by the first server to provide the first service over public IP connections, (ii) a public IP address corresponding to the hostname, and (iii) an indication that the request is for forward DNS resolution. Here, to perform the requested forward DNS resolution, the second server requests that a DNS server associated with the second server provide a resolved public IP address that is mapped to the hostname associated with the first server; verifies whether the resolved public IP address matches the public IP address included in the request for the second server to check the first service; and transmits a result of verification to the first server as the information relating to whether the first service is available over public IP connections.

In some implementations, the request for the second server to check the first service can include (i) a hostname associated with the first server used by the first server to provide the first service over public IP connections, (ii) a public IP address corresponding to the hostname, and (iii) an indication that the request is for reverse DNS resolution. Here, to perform the requested reverse resolution, the second server requests that a DNS server associated with the second server provide a resolved hostname that is mapped to the public IP address to which the hostname associated with the first server corresponds; verifies whether the resolved hostname matches the hostname included in the request for the second server to check the first service; and transmits a result of verification to the first server as the information relating to whether the first service is available over public IP connections.

In general, another aspect of the subject matter described in this specification can be implemented in a method that is performed by a first server running on a first computer system, the first server to provide a first service over public Internet Protocol (IP) connections. The method includes transmitting, over public IP connections to a second server running on a second computer system, a request for the second server to check the first service; receiving, from the second server over public IP connections, in response to the request for the second server to check the first service, information relating to whether the first service is available over public IP connections; and updating an availability status of the first service over public IP connections based on the information received from the second server.

In some implementations, receiving the information relating to whether the first service is available over public IP connections can include receiving, from the second server over public IP connections, a range of public IP addresses from which the second server is to connect to the first service; receiving, from the range of public IP addresses, a request for connection to the first service; and upon receipt of the range of public IP addresses from the second server, listening for the request to connect to the first service from the range of public IP addresses. Here, the availability status of the first service over public IP connections is updated based on whether the request to connect to the first service is received from the range of public IP addresses at the first service within a predetermined time interval, the predetermined time interval being counted from receipt of the range of public IP addresses from the second server.

Further, the availability status of the first service over public IP connections is updated without transmitting, over public IP connections to the second server, an acknowledgment as to whether the request to connect to the first service transmitted by the second server was received at the first service. Furthermore, updating the availability status of the first service can include updating the availability status to available over IP connections if the request to connect to the first service from the range of public IP addresses is received at the first service within the predetermined time interval, or updating the availability status to unavailable otherwise.

In some implementations, transmissions over public IP connections between the first and second servers can be performed in accordance with a transmission control protocol (TCP), and the request to connect to the first service is transmitted as a SYN TCP packet. In some implementations, the range of public IP addresses can include a subnet associated with the second server. For instance, the range of public IP addresses can include a particular IP address associated with the second server.

In some implementations, the method further can include repeatedly transmitting, over public IP connections to the second server, the request for the second server to check the first service. In some cases, a frequency of transmissions of the request for the second server to check the first service is less than a predetermined frequency. In some cases, the method further can include stopping the repeated transmissions of the request for the second server to check the first service in response to input from a user of the first computer system.

In some implementations, the request for the second server to check the first service can include identification of a first port of the first server over which the first service is to be provided over public IP connections. Here, the request to connect to the first service is received front the range of public IP addresses at the first port of the first server and represents the information relating to whether the first service is available over public IP connections. Additionally, the method further can include determining whether the first port is open based on whether the request to connect to the first service is received at the first port from the range of public IP addresses within the predetermined time interval, such that the availability status of the first service over the Internet is updated based on whether the first port is open.

In some such cases, the method further can include receiving, from the range of public IP addresses to a second port of the first server, a request for connection to a second service, the second service to be provided by the first server at the second port over private IP connections; determining whether the second port is open based on whether the request to connect to the second service is received at the second port from the range of public IP addresses within the predetermined time interval; and updating an unintended availability status of the second service based on whether the second port is open.

In some implementations, the request for the second server to check the first service can include—in addition to the identification of the first port identifier—information relating to an initial data packet to be transmitted from the first service. Here, the method further can include responsive to receipt of the request to connect to the first service at the first port from the range of public IP addresses, transmitting, over public IP connections to the second server, an acknowledgement indicating that connection with the first service at the first port has been established; receiving, at the first port from the range of public IP addresses, the acknowledgement reflected by the second server; and determining proper functionality of the first service over public IP connections at the first port based on whether the reflected acknowledgement correlates with the initial data packet to be transmitted from the first service.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

Figure 1:
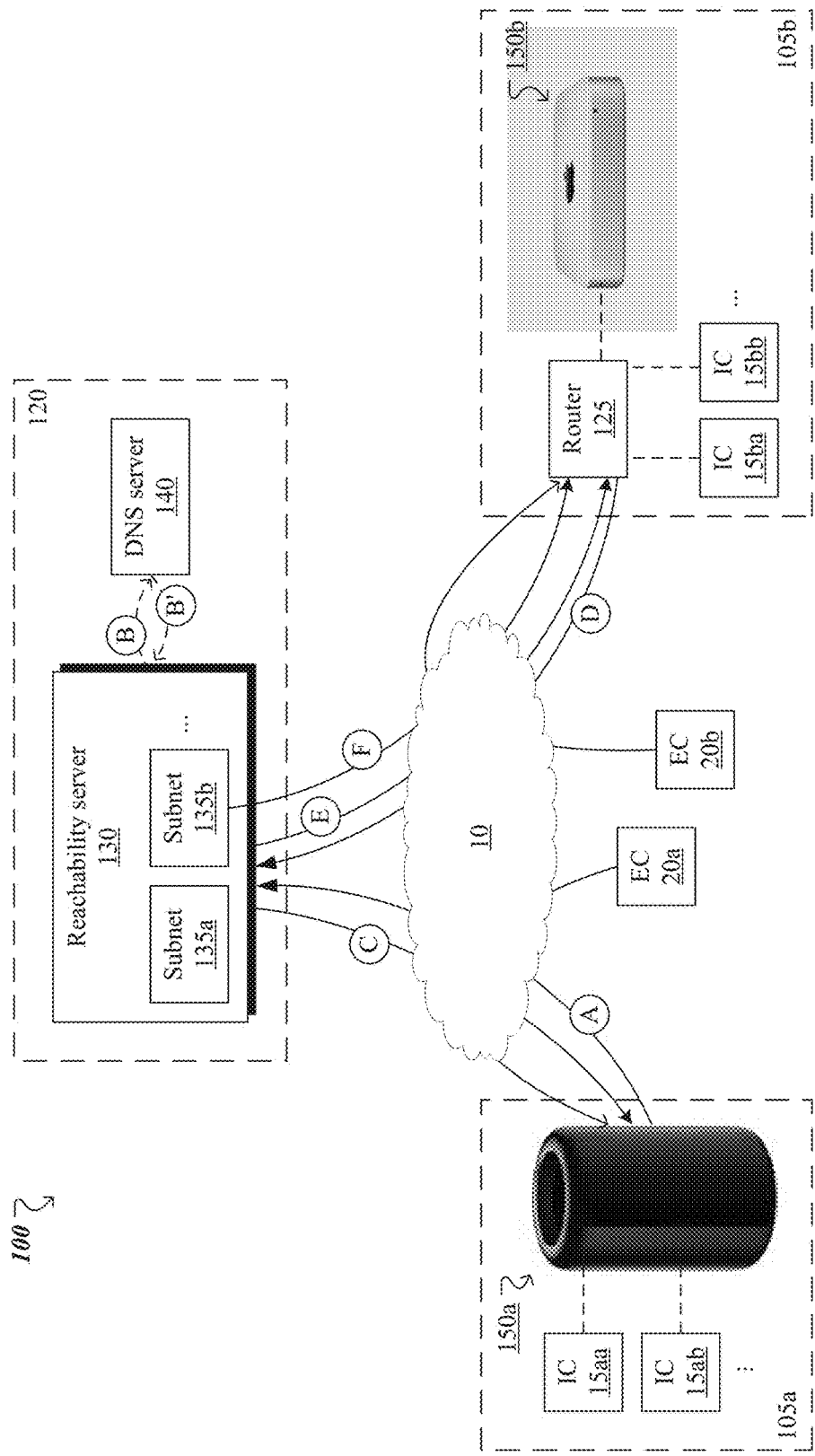
FIG. 1 illustrates an example of a system for checking services provided by one or more servers over public IP connections using a cloud-based infrastructure.

In accordance with the disclosed technologies, a cloud-based infrastructure is configured to interact with a plurality of servers. In some implementations, the cloud-based infrastructure is managed and operated by an entity associated with the plurality of servers (e.g., the cloud-based infrastructure can be Apple Inc.'s iCloud® when the plurality of servers are instances of the OS X Server®). A computer system of the cloud-based infrastructure includes a server referred to as a reachability server. The reachability server is configured to act as an external client of (or to be an external client impersonator for) a server from among the plurality of servers in order to check services provided by the server over public IP connections. Here, a potential external client is to communicate with the server through public IP connections associated with the server, as opposed to an internal client which communicates with the server through private IP connections associated with the server. For instance, the server can send requests to the reachability server for domain name system (DNS) lookups (e.g., to determine whether DNS is setup correctly), port lookups (e.g., to determine which ports of the server are open for external clients), mail exchanger (MX) lookups, etc.

In some implementation, responsive to receipt of the request for the reachability server to check the services provided by the server over public IP connections, the reachability server provides to the server a range of public IP addresses from which the reachability server is to connect to the services to be checked. Then, the reachability server transmits to the server from the range of public IP addresses requests for connection to the services to be checked.

Upon receipt by the server of the range of public IP addresses from the reachability server, the server starts listening for the requests to connect to the service from the range of public addresses. The server determines availability of the services provided over public IP connections based on whether the requests to connect to the service to be checked are received from the range of public IP addresses within a predetermined time interval. Here, the predetermined time interval is counted from receipt by the server of the range of public IP addresses from the reachability server. The checked services are determined to be available over public IP connections if the requests to connect to the server transmitted from the range of public IP addresses are received at the server within the predetermined time interval, or unavailable otherwise.

Advantageously, results of the disclosed service checks performed by the server in partnership with the reachability server are used to determine an accurate picture of the public IP connections associated with the server from a perspective of a potential external client. As such, results of the service checks can shed light on how services provided by the server over public IP connections are available to the external client. Often, the server is setup and maintained inside of an internal network, such that determining whether the server can be reached from outside the internal network is beneficial. Also, because availability of the services over the public IP connections is determined by the server without having to transmit acknowledgments to the reachability server as to whether the requests to connect to the services to be checked transmitted by the reachability server were received by the server, the disclosed checks can be performed simply and securely (without requiring authentication, etc.)

System for Checking Services Provided by Servers Over Public IP Connections Using a Cloud-Based Infrastructure FIG. 1 illustrates an example of a system 100 for checking services provided by one or more servers 150a, 150b, . . . over public IP connections using a cloud-based infrastructure (e.g., Apple Inc.'s iCloud®). Here, the system 100 includes a first internal network 150a (e.g. a business network) that contains a particular server 150a (e.g., an instance of an OS X Server) and second internal network 105b (e.g. a home network) that contains another server 150b (e.g., another instance of the OS X Server). Additionally, the cloud-based infrastructure includes a computer system 120 that contains a server 130 referred to as a reachability server. The reachability server 130 is configured to communicate with the particular server 150a and with the other server 150b over a public network 10 (e.g., over the Internet and/or other networks) through public IP connections (represented as continuous lines.) In some implementations, communications between the reachability server 130 and the particular server 150a or the other server 150b over the public IP connections are carried out through transmission control protocol (TCP). In some implementations, the communications between the reachability server 130 and the particular server 150a or the other server 150b over the public IP connections are carried out through user datagram protocol (UDP).

In the example illustrated in FIG. 1, the particular server 150a is configured in gateway configuration. In this manner, the particular server 150a uses a first network interface to communicate, within the internal network 150a, with multiple internal clients (IC) 15aa, 15ab, . . . through private IP connections (represented as dashed lines). The internal clients 15aa, 15ab, . . . can be smart phones, MP3 players, tablet computers, laptops, workstations, printers, etc. Additionally, the particular server 150a uses a second network interface to communicate with external clients (EC) 20a, 20b, . . . over the public network 10. As such, communications between the particular server 150a and external clients, e.g., EC 20a, is carried out through public IP connections (represented as continuous lines.) The external clients 20a, 20b, . . . can be smart phones, laptops, etc.

The particular server 150a is configured to provide a set of internal services to the internal clients 15aa, 15ab, . . . . The internal services include a file sharing service, a backup service, a caching service, a mail service, a messaging service, a web service, a wiki service, a contacts service, a calendar service, etc. Additionally, the particular server 150a is configured to provide a different set of external services to the external clients 20a, 20b, . . . . The set of external services—is typically a subset of the set of internal services and—may include the mail service, the web service, and potentially the wiki service, etc.

Further in the example illustrated in FIG. 1, the second internal network 105b includes a router 125 that has an external network interface for communicating with the computing devices 20a, 20b, . . . through public IP connections (represented as continuous lines), and an internal network interface for communicating with the other server 150b and internal computing devices 15ba, 15bb, . . . through private IP connections (represented as dashed lines). Here, the other server 150b has a single network interface to communicate with the internal network interface of the router 125. As such, the other server 150 provides another set of internal services to the internal clients 15ba, 15bb, . . . using the internal network interface of the router 125. Moreover, a network address translation port mapping protocol (NAT-PMP), for instance, can be used by the other server 150b to automatically configure the router 125 to allow the external clients 20a, 20b, . . . outside of the private network 105b to contact the other server 150b. In this manner, the other server 150b provides to the external clients 20a, 20b, . . . another different set of external services, such that, once again, the other set of external services can be a subset of the other set of internal services.

As the reachability server 130 is external to the internal networks 150a, 105b, it is used to act like an external client from the perspective of the particular server 150a that is part of the first internal network 150a or of the other server 150b that is part of the second internal network 1051b. In this manner, the reachability server 130 assists the particular server 150a and/or the other server 150b in checking whether external clients 20a, 20b, . . . , can connect to the particular server 150a and/or the other server 150b, and hence, whether services provided by the particular server 150a and/or the other server 150b over public IP connections are available to external clients 20a, 20b, . . . .

In some implementations, the set of external services provided by the particular server 150a or by the other server 150b consist of a single service, namely, a VPN service. Here, once the external clients 20a, 20b, . . . connect to the particular server 150a (or the other server 150b) using the VPN service, they become part of the first internal network 150a (or second internal network 105b), and have access to other services provided by the particular server 150a (or the other server 150b) for its internal clients 15aa, 15ab, . . . (or 15ba, 15bb, . . . ) In this case, the reachability server 130 checks only whether external clients 20a, 20b, . . . , can connect to the VPN service provided by the particular server 150a and/or the other server 150b.

Several types of checks of services—provided by the particular server 150a or by the other server 1501b over public IP connections—which can be performed in accordance with the disclosed technologies using the reachability server 130 are described below.

A first type of check performed using the reachability server 130 is a DNS lookup. An example of a DNS lookup is described here with reference to a given service provided by a hostname (e.g., mycompany.com) associated with the particular server 150a.

The DNS lookup begins when the particular server 150a transmits a check request (A) for DNS lookup to the reachability server 130 over a public IP connection. As noted above, the particular server 150a and the reachability server 130 communicate over public IP connections using TCP or UDP. For instance, the check request (A) for DNS lookup can be a TCP packet that has a header and a payload. The header of the check request (A) for the DNS lookup includes a public IP address corresponding to the hostname associated with the particular server 150a. The payload of the check request (A) for the DNS lookup includes parameters such as, e.g., the hostname and/or MX records associated with the particular server 150a and an indication whether the reachability server 130 is to perform forward DNS resolution, reverse DNS resolution or both.

In response to receiving the check request (A), the reachability server 130 transmits to a DNS server 140 associated with the reachability server 130 a request (B) for DNS records associated with the particular server 150a that are mapped by and stored at the DNS server 140.

If the reachability server 130 is to perform forward DNS resolution, the request (B) for DNS records includes the hostname specified by the check request (A) for DNS hookup. In this case, the DNS server 140 transmits to the reachability server 130 a response (B') including a resolved public IP address corresponding to the hostname specified by the request (A) for DNS lookup. Here, the reachability server 130 determines that either (i) a result of the forward DNS resolution is true, that is when the resolved public IP address specified in the response (B') matches the public IP address included in the check request (A) for DNS lookup, or (ii) a result of the forward DNS resolution is false, that is when the resolved public IP address specified in the response (B') is different from the public IP address included in the check request (A) for DNS lookup.

If the reachability server 130 is to perform reverse DNS resolution, the request (B) for DNS records includes the public IP address included in the check request (A) for lookup. In this case, the DNS server 140 transmits to the reachability server 130 a response (B') including the resolved hostname to which the public IP address included in the check request (A) the DNS lookup corresponds. Here, the reachability server 130 determines that either (i) a result of the reverse DNS resolution is true, that is when the resolved hostname specified in the response (B') matches the hostname specified by the check request (A) for DNS lookup, or (ii) a result of the reverse DNS resolution is false, that is when the resolved hostname specified in the response (B') is different from the hostname specified by the check request (A) for DNS lookup.

In some implementations, the reachability server 130 is to perform both the forward and reverse DNS resolutions. In this case the request (B) for DNS records includes both the hostname specified by and the public IP address included in the check request (A) for DNS lookup. Further in this case, the response (B') includes both the resolved public IP address corresponding to the hostname specified by the request (A) for DNS lookup and the resolved hostname to which the public IP address included in the check request (A) for DNS lookup corresponds. In this case, the determinations whether each of the forward and reverse DNS resolutions is true or false are performed as described above.

After performing the requested DNS lookup, the reachability server 130 transmits, to the particular server 150a over the public IP connection, a response (C) to the check request (A) for DNS lookup. The response (C) includes a result of the forward DNS resolution. In some implementations, the result is in Boolean format. For example, if the check request (A) for DNS lookup specifies forward DNS resolution, the result included in the response (C) can be True or False. As another example, if the check request (A) for DNS lookup specifies reverse DNS resolution, the result included in the response (C) can be True or False. As yet another example, if the check request (A) for DNS lookup specifies both forward DNS resolution and reverse DNS resolution, the result included in the response (C) can be (i) (True, True); (ii) (True, False); (iii) (False, True); and (iv) (False, False).

If the response (C) received by the particular server 150a to the check request (A) for the DNS lookup is False, then the particular server 150a updates the status of the given service provided at the hostname associated with the particular server 150a—to "unavailable" over public IP connections. Else, if the response (C) received by the particular server 150a to the check request (A) for the DNS lookup is True, then the particular server 150a updates the status of the given service provided at the hostname associated with the particular server 150a—to "available" over public IP connections.

Other types of DNS request can be implemented using the disclosed technologies. For instance, the reachability server 130 can obtain, from the DNS server 140, MX records for a domain associated with the particular server 150a. For example, an MX record establishes a mapping between a mail domain (having an associated IP address) and a mail hostname (e.g., mailserver.mycompany.com).

Processes to be implemented in the system 100 for performing DNS lookups are described in detail below in connection with FIGS. 2A-2B.

Referring again to FIG. 1, another type of check performed using the reachability server 130 is a port lookup. An example of a port lookup is described here with reference to a certain service provided at one or more ports of the other server 150b.

A check request (D) for the port lookup—transmitted by the other server 150b over a public IP connection (provided by the router 125) to the reachability server 130—includes a list of the one or more ports to be checked, e.g., ports 80, 143, etc. In response to receiving the check request (D) for the port lookup, the reachability server 130 transmits, to the other server 150b over the public IP connection, an acknowledgement (E) of the check request (D). The acknowledgment (E) transmitted by the reachability server 130 to the other server 150b includes subnet information (e.g., identifiers of a set of addresses) associated with a subnet 135b from which the reachability server 130 will communicate with the other server 150b while performing the requested check for port lookup. Once the other server 150b receives the acknowledgement (E) with the subnet information from the reachability server 130, the other server 150b starts listening at the ports specified in the check request (D) for port lookup for communication requests from addresses within the subnet 135b of the reachability server 130. In this manner, the reachability server 130 will not know the results of the check, on purpose: as such, the reachability server 130 cannot go to a particular server 150a, to check services provided by the particular server 150a; instead, the reachability server 130 will securely connect, from the subnet 135b, to the services of only the other server 150b that requested the check.

After transmitting the acknowledgement (E), the reachability server 130 sequentially or concurrently transmits a connection request (F) to the ports referenced in the check request (D) for port lookup. Here, the connection request (F) can be in the form of a SYN TCP packet. The other server 150b is listening at the ports specified in the check request (D) for a SYN TCP packet sent (through the router 125) with the connection request (F) from the subnet 135b of the reachability server 130. If the other server 150b determines that a SYN TCP packet is not received at a given port from the subnet 135b of the reachability server 130 within a time interval $\Delta T_S$, then the other server 150a updates a status of the given port to "closed". Note that the time interval $\Delta T_S$ can be, e.g., 0.5, 1, 3 sec, and is measured from the time when the acknowledgment (E) is received by the other server 150b. As such, a corresponding service provided over public IP connections by the other server 150b at the given port is unavailable. For instance, if port 80 is found to be closed, it is assumed that a web service running on the other server 150b is not accessible by external clients 20a, 20b, . . . . Else, if the other server 150b determines that a SYN TCP packet is received at the given port from the subnet 135b of the reachability server 130 within the time interval $\Delta T_S$, then the other server 150b updates the status of the given port to "open". As such, the corresponding service provided over public IP connections by the other server 150b at the given port is presumed to be available. For instance, if port 80 is found to be open, it is assumed that the web service running on the other server 1150b is accessible by external clients 20a, 20b, . . . .

Note that although the other server 150b receives the SYN TCP packet at the given port, because the received SYN TCP packet is from the subnet 135b of the reachability server 130, no acknowledgment of the received SYN TCP packet is transmitted by the other server 150b to the reachability server 130. Moreover, the SYN TCP packet received at the given port is not seen by the service(s) provided by the other server 150b.

A process to be implemented in the system 100 for performing port lookups is described in detail below in connection with FIG. 3A.

Referring again to FIG. 1, it is noted that the reachability server 130 can carry out a DNS lookup—e.g., triggered by the check request (A) received from the particular server 150a—concurrently with a port lookup—e.g., triggered by the check request (D) received from the other server 150b. Further, the reachability server 130 can concurrently carry out DNS lookups for multiple servers, e.g., for the particular server 150a and the other server 150b. Furthermore, the reachability server 130 can concurrently carry out port lookups for multiple servers, e.g., for the particular server 150a and the other server 150b.

Further note that the check(s) disclosed herein can be performed when each of the particular server 150a or the other server 150b is launched. In some implementations, additional checks can be performed repeatedly by either the pair of particular server 150a and reachability server 130 or the pair of other server 150b and reachability server 130. For example, the checks can be performed once every 3, 10 or 30 min when traffic at the particular server 150a or the other server 150b exceeds a traffic threshold or at longer intervals when the traffic does not exceed the target.

In some implementations, one or more of the checks disclosed above can be turned off or back on at the particular server 150a or the other server 150b, either automatically (based on a predetermined schedule) or manually by administrators of the respective servers, for instance.

The technologies described above for performing the port lookups can be further extended to determine additional aspects of service reachability, availability and functionality.

In some implementations, the reachability server 130 also can be used to perform a negative port lookup to determine ports of the other server 150b that should not be open but are open. In some cases, a file service provided by the other server 150b uses a given port that is open for internal clients 15ab, 15bb, . . . but should not be open for external clients 20a, 20b, . . . . In other cases, although the file service currently may not be used even for internal clients 15ab, 15bb, . . . , the given port should not be open for external clients 20a, 20b, . . . , because the file service will be turned on by the other server 150b only for the internal clients 15ab, 15bb, . . . at a later point.

As such, the reachability server 130 is configured to transmit the connection request (F) to the ports referenced in the check request (D) for port lookup, and opportunistically transmit the connection request (F) to one or more additional ports that are not referenced in the check request (D). Here, the other server 150b is configured to listen for the connection request (F) from the reachability server 130 not only on the ports referenced in the check request (D) for port lookup, but also on the additional ports that are not referenced in the check request (D). As the connection request (F) is received at the additional ports of the other server 150b from the expected subnet 135b of the reachability server 130, such negative port lookup can be distinguished by the other server 150b from potential connection requests that were abusively transmitted by one or more of the external clients 20a, 20b, . . . to the additional ports of the other server 150b.

The additional ports on which to perform the negative port lookups can be automatically selected by the reachability server 130 from among multiple ports of interest. For example, the ports of interest can be provided to the reachability server 130 as a predefined list of ports by the other server 150b. As another example, the ports of interest can be determined dynamically by the reachability server 130 based on trends over previous check requests for port lookup from the other server 150b or from multiple other similar servers.

A process to be implemented in the system 100 for performing negative port lookups is described in detail below in connection with FIG. 3B.

Referring again to FIG. 1, it was noted above that if a given port of the other server 150b is found to be open, then it is concluded that services offered over that port are available. However, although the services provided over the given port may be available, further checks can be performed to determine whether the available services function properly. As that may not always be the case, instead of simply determining that a port associated with a service provided by the other server 150b is open, the reachability server 130 can be used to check whether the service provided through the open port is working properly.

In this manner, the check request (D) for port lookup can include, in addition to an identifier of a port to be checked, service identifier information (e.g., an initial packet expected to be received such as a beginning tag of a web page, a security certificate, etc.) Such service identifier information is to be used by the reachability server 130 to determine whether the service available at the open port of the other server 150b is working properly. In order to determine whether a service available at an open port is working properly, the SYN TCP packet (F) received by the other server 150b from the reachability server 130 is acknowledged. As such, the other server 150b sends an ACK TCP packet to the reachability server 130 to establish a proper TCP communication with the reachability server 130. If the service available at the open port is working properly, the ACK TCP packet transmitted by the other server 150b to the reachability server 130 includes the service identifier information referenced in the check request (D). In such case, the reachability server 130 can confirm that the service available at the open port is working properly.

As the foregoing check for determining the propriety of the service available at the open port of the other server 150b can be performed repeatedly, when the reachability server 130 determines that the service is working improperly, the reachability server 130 can notify the other server 150b that the service is working improperly.

Processes to be implemented in the system 100 for checking whether services deemed to be available function properly are described in detail below in connection with FIGS. 4 and 5.

DNS Lookups Using a Cloud-Based Infrastructure

Figure 2A:
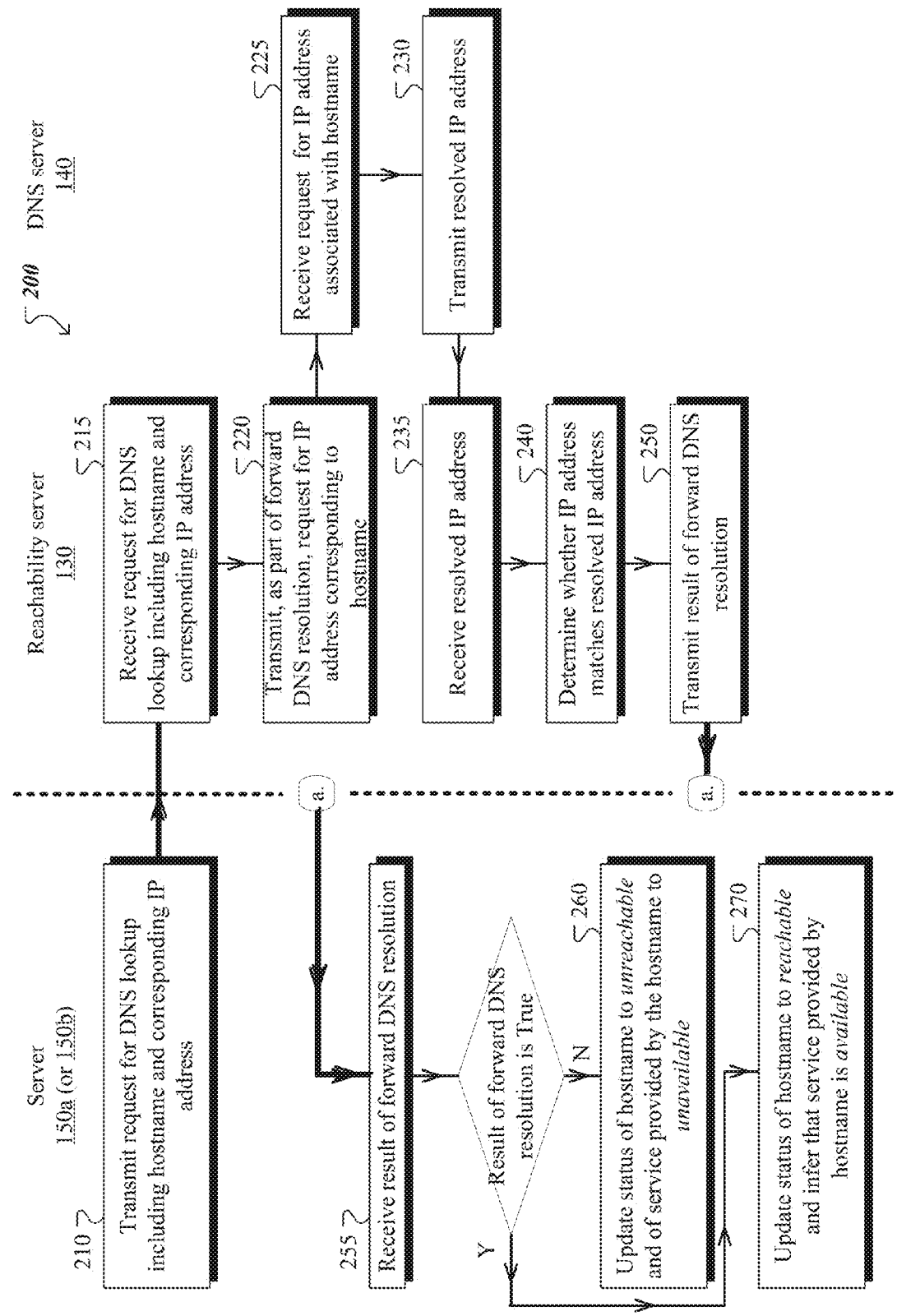
FIGS. 2A-2B are flow charts of examples of processes for providing DNS lookups using a cloud-based infrastructure.

FIG. 2A is a flow chart of an example of a process 200 for providing DNS lookups using a cloud-based infrastructure, where at type of the DNS lookups is forward DNS resolution. The process 200 can be implemented in the system 100 described above in connection with FIG. 1. For instance, some of the operations of the process 200 can be performed at a particular server 150a (or at another server 150b) and other operations of the process 200 can be performed at a reachability server 130 that is part of a computer system 120 of a cloud-based infrastructure for service checking. Moreover, some other of the operations of the process 200 can be performed at the DNS server 140 associated with the cloud-based infrastructure for service.

At 210, the server 150a (or 150b) transmits, over a public IP connection to the reachability server 130, a request for DNS lookup. Here, a payload of the transmitted request specifies at least a hostname associated with the server 150a (or 150b) and a header of the transmitted request includes a public IP address corresponding to the hostname.

At 215, the reachability server 130 receives, over the public IP connection from the server 150a (or 150b), the request for DNS lookup that specifies the hostname associated with the server 150a (or 150b) and includes the public IP address corresponding to the hostname. In the example illustrated in FIG. 2A, the reachability server 130 triggers forward DNS resolution.

At 220, to start off the forward DNS resolution, the reachability server 130 transmits to the DNS server 140 a request for a public IP address mapped by the DNS server 140 to the hostname specified in the request for DNS lookup received at 215.

At 225, the DNS server 140 receives the request for the public IP address mapped by the DNS server 140 to the hostname specified in the request for DNS lookup. Here, the DNS server 140 resolves the public IP address that is mapped to the hostname.

At 230, responsive to resolution of the public IP address that is mapped to the hostname, the DNS server 140 transmits the resolved public IP address to the reachability server 130.

At 235, the reachability server 130 receives the resolved public IP address from the DNS server 140.

At 240, in response to the receiving of the resolved public IP address, the reachability server 130 determines whether the public IP address included in the request for DNS lookup received at 215 matches the resolved public IP address.

At 250, responsive to the determination whether the public IP address included in the request for DNS lookup received at 215 matches the resolved public IP address, the reachability server 130 transmits, over the public IP connection to the server 150a (or 150b), a result of the forward DNS resolution performed in response to the request for DNS resolution received at 215.

At 255, the server 150a (or 150b) receives, over the public IP connection from the reachability server 130, the result of the forward DNS resolution performed by the reachability server 130 in response to the request for DNS lookup transmitted at 210.

If the result of the forward DNS resolution received from the reachability server 130 is false, that is when the public IP address included in the request for DNS lookup transmitted at 210 is different from the public IP address resolved by the DNS server 140, then at 260, the server 150a (or 150b) updates a status of the hostname associated with the server 150a (or 150b) to unreachable from public IP addresses. As such, a service provided by the hostname associated with the server 150a (or 150b) is unavailable over public IP connections. In this case, various corrective measures can be taken at the server 150a (or 150b), either automatically or through user intervention, to address the determined service unavailability.

Else, if the result of the forward DNS resolution received from the reachability server 130 is true, that is when the public IP address included in the request for DNS lookup transmitted at 210 matches the public IP address resolved by the DNS server 140, then at 270, the server 150a (or 150b) updates a status of the hostname associated with the server 150a (or 150b) to reachable from public IP addresses. As such, it is inferred that the service provided by the hostname associated with the server 150a (or 150b) is available over public IP connections.

Figure 2B:
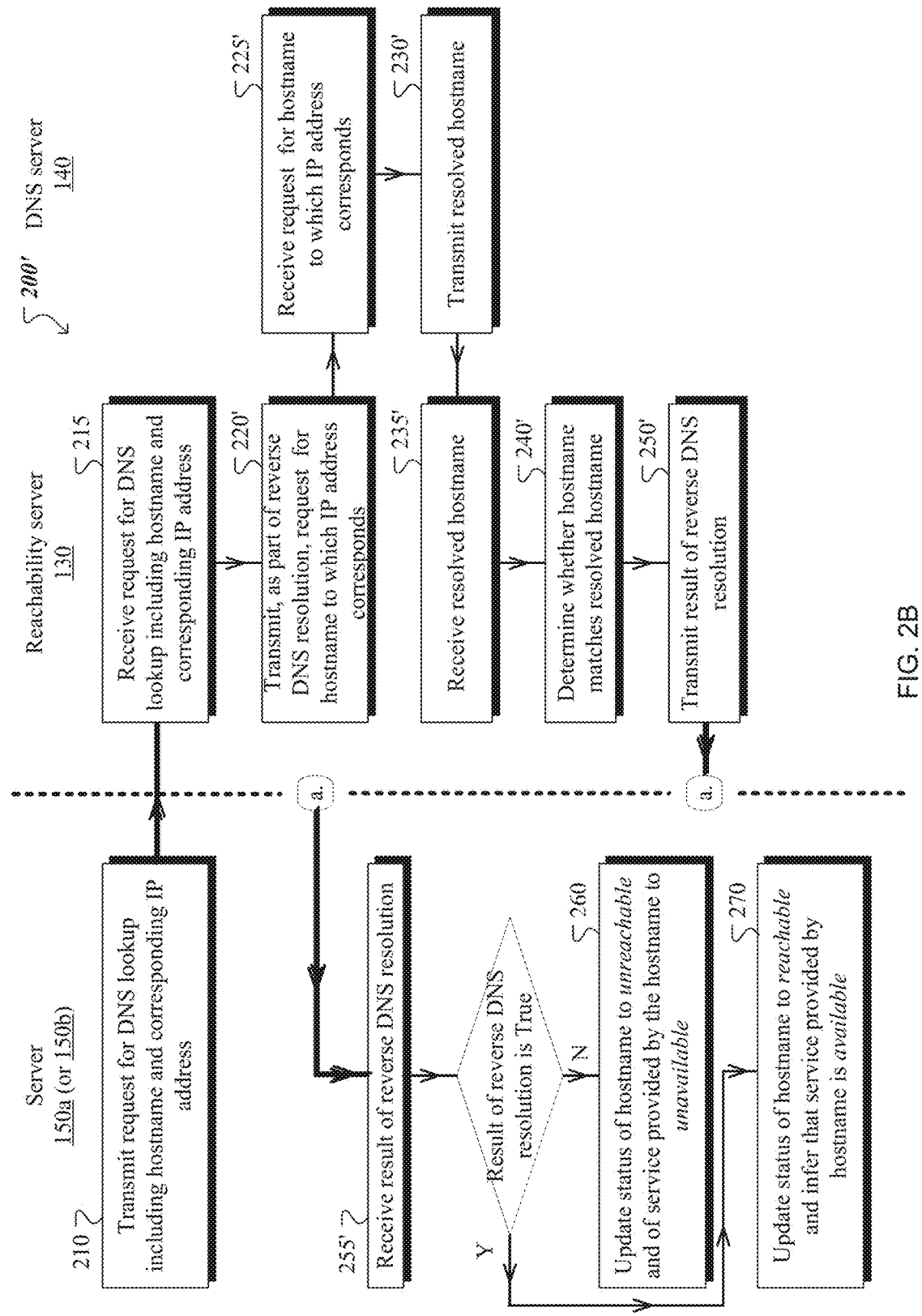

FIG. 2B is a flow chart of an example of a process 200' for providing DNS lookups using a cloud-based infrastructure, where at type of the DNS lookups is reverse DNS resolution. The process 200' can be implemented in the system 100 described above in connection with FIG. 1. For instance, some of the operations of the process 200' can be performed at a particular server 150a (or at another server 150b) and other operations of the process 200' can be performed at a reachability server 130 that is part of a computer system 120 of a cloud-based infrastructure for service checking. Moreover, some other of the operations of the process 200' can be performed at the DNS server 140 associated with the cloud-based infrastructure for service. Additionally, the process 200' can be performed concurrently with or sequentially from the process 200 described above in connection with FIG. 2B.

Turning now to FIG. 2B, at 210, the server 150a (or 150b) transmits, over a public IP connection to the reachability server 130, a request for DNS lookup. Here, a payload of the transmitted request specifies a hostname associated with the server 150a for 150b) and a header of the transmitted request includes a public IP address corresponding to the hostname.

At 215, the reachability server 130 receives, over the public IP connection from the server 150a (or 150b), the request for DNS lookup that specifies the hostname associated with the server 150a (or 150b) and includes the public IP address corresponding to the hostname. In the example illustrated in FIG. 2B, the reachability server 130 triggers reverse DNS resolution.

At 220', to start off the reverse DNS resolution, the reachability server 130 transmits to the DNS server 140 a request for a hostname mapped by the DNS server 140 to the public IP address included in the request for DNS lookup received at 215.

At 225', the DNS server 140 receives the request for the hostname mapped by the DNS server 140 to the public IP address included in the request for DNS lookup. Here, the DNS server 140 resolves the hostname that is mapped to the public IP address.

At 230', in response to resolution of the hostname that is mapped to the public IP address, the DNS server 140 transmits the resolved hostname to the reachability server 130.

At 235', the reachability server 130 receives the resolved hostname from the DNS server 140.

At 240', in response to the receiving of the resolved hostname, the reachability server 130 determines whether the hostname specified by the request for DNS lookup received at 215 matches the resolved hostname.

At 250', responsive to the determination whether the hostname specified by the request for DNS lookup received at 215 matches the resolved hostname, the reachability server 130 transmits, over the public IP connection to the server 150a (or 150b), a result of the reverse DNS resolution performed in response to the request for DNS resolution received at 215.

At 255', the server 150a (or 150b) receives, over the public IP connection from the reachability server 130, the result of the reverse DNS resolution performed by the reachability server 130 in response to the request for DNS lookup transmitted at 210.

If the result of the reverse DNS resolution received from the reachability server 130 is false, that is the hostname specified by the request for DNS lookup transmitted at 210 is different from the hostname resolved by the DNS server 140, then at 260, the server 150a (or 150b) updates a status of the hostname associated with the server 150a (or 150b) to unreachable from public IP addresses. As such, a service provided by the hostname associated with the server 150a (or 150b) is unavailable over public IP connections. In this case, various corrective measures can be taken at the server 150a (or 150b), either automatically or through user intervention, to address the determined service unavailability.

Else, if the result of the reverse DNS resolution received from the reachability server 130 is true, that is the hostname specified by the request fir DNS lookup transmitted at 210 matches the hostname resolved by the DNS server 140, then at 270, the server 150a (or 150b) updates a status of the hostname associated with the server 150a (or 150b) to reachable from public IP addresses. As such, it is inferred that the service provided by the hostname associated with the server 150a (or 150b) is available over public IP connections.

Port Lookups Using a Cloud-Based Infrastructure

Figure 3A:
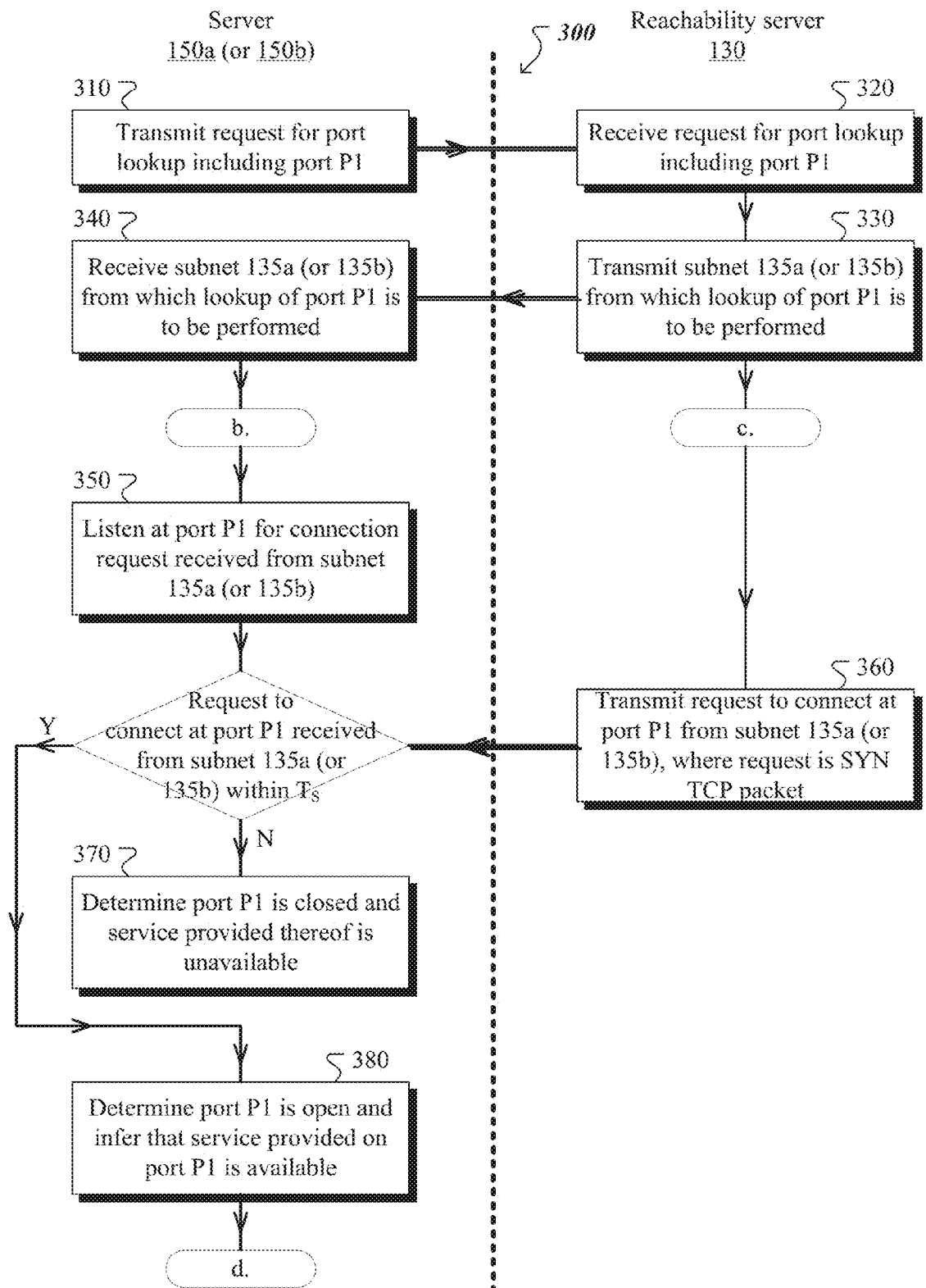
FIG. 3A is a flow chart of an example of a process for providing port lookups using a cloud-based infrastructure.

FIG. 3A is a flow chart of an example of a process 300 for providing port lookups using a cloud-based infrastructure. The process 300 can be implemented in the system 100 described above in connection with FIG. 1. For instance, some of the operations of the process 300 can be performed at a particular server 150a (or at another server 150b) and other operations of the process 300 can be performed at a reachability server 130 that is part of a computer system 120 of a cloud-based infrastructure for service checking. Moreover, the process 300 can be performed sequentially or concurrently with the process 200 described above in connection with FIGS. 2A-2B.

At 310, the server 150a (or 150b) transmits, over a public IP connection to the reachability server 130, a request for port lookup. In this case, the transmitted request includes at least an identifier of a port P1 of the server 150a (or 150b) to be checked. For example, the identifier of a port at which the server 150a (or 150b) web services over public IP connections is a port number 80.

At 320, the reachability server 130 receives, over the public IP connection from the server 150a (or 150b), the request for port lookup that includes the identifier of the port P1 of the server 150a (or 1504b).

At 330, in response to the receiving of the request for port lookup, the reachability server 130 transmits, over the public IP connection to the server 150a (or 150b), a subnet 135a (or 135b) from which the lookup for port P1 is to be performed by the reachability server 130.

At 340, the server 150a (or 150b) receives, over the public IP connection from the reachability server 130, the subnet 135a (or 135b) from which the lookup for port P1 is to be performed by the reachability server 130.

At 350, in response to the receiving of the subnet 135a (or 135b) from which the hookup for port P1 is to be performed by the reachability server 130, the server 150a (or 150b) listens at port P1 for a connection request received from the subnet 135a (or 135b).

In the meantime, after the transmitting at 330 of the subnet 135a (or 135b), the reachability server 130 can perform the lookup for port P1 in the following manner.

At 360, the reachability server 130 transmits, over the public IP connection to the server 150a (or 150b), a request to connect at the port P1 specified in the request for port hookup received at 320 from the server 150a (or 150b). Here, the request to connect to the port P1 can be a SYN TCP packet and is transmitted to the server 150a (or 150b) from the subnet 135a (or 135b), as specified in the transmission performed at 330.

At this point, the server 150a (or 150b) verifies whether a request to connect at port P1 is received from the subnet 135a (or 135b) of the reachability server 130 within a predefined time interval $\Delta T_S$. Here, the predefined time interval $\Delta T_S$ is measured from the time when the subnet 135a (or 135b) is received at 340 by the server 150a (or 150b).

If a result of verification is that a request to connect at the port P1 is not received by the server 150a (or 150b) from the subnet 135a (or 135b) of the reachability server 130 within the predefined time interval $\Delta T_S$, then, at 370, the server 150a (or 150b) determines that the port P1 is closed for connections from public IP addresses. As such, a service provided at the port P1 of the server 150a (or 150b) is unavailable over public IP connections. In this case, various corrective measures can be taken at the server 150a (150b), either automatically or through user intervention, to address the determined service unavailability.

Else, if the result of the verification is that the request to connect at the port P1 is received by the server 150a (or 150b) from the subnet 135a (or 135b) of the reachability server 130 within the predefined time interval $\Delta T_S$, then, at 380, the server 150a (or 150b) determines that the port P1 is open for connections from public IP addresses. As such, it is presumed that the service provided at the port P1 of the server 150a (or 150b) is available over public IP connections.

Negative Port Lookups Using a Cloud-Based Infrastructure

Figure 3B:
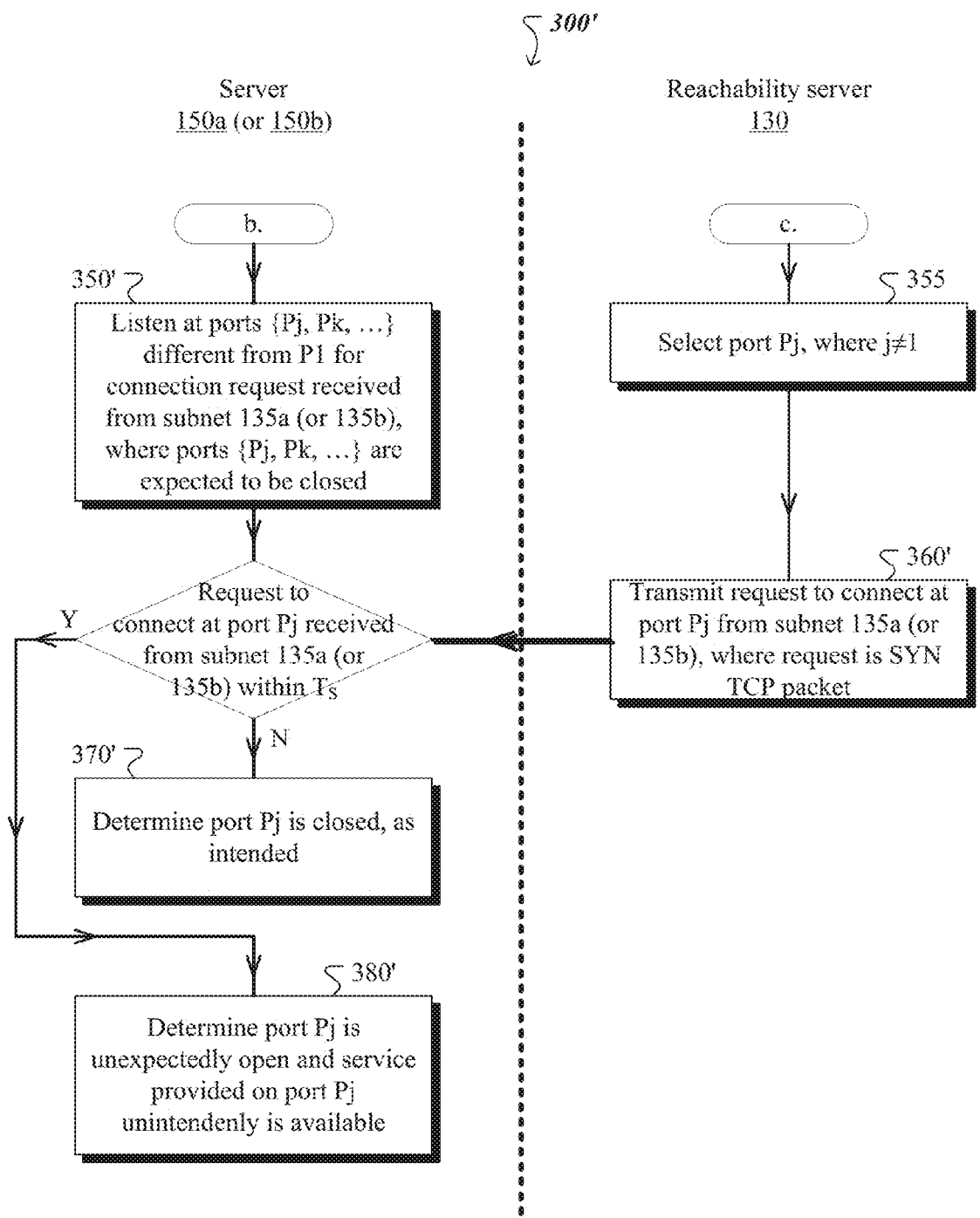
FIG. 3B is a flow chart of a portion of an example of a process for providing negative port lookups using a cloud-based infrastructure.

FIG. 3B is a flow chart of a portion of an example of a process 300' for providing negative port lookups using a cloud-based infrastructure. The process 300' can be implemented in the system 100 described above in connection with FIG. 1. For instance, some of the operations of the process 300' can be performed at a particular server 150a (or at another server 150b) and other operations of the process 300' can be performed at a reachability server 130 that is part of a computer system 120 of a cloud-based infrastructure for service checking. Further, the process 300' can be performed sequentially or concurrently with the process 200 described above in connection with FIGS. 2A-2B. Furthermore, the operations performed at 310-340 of the process 300 are the same for the process 300', and hence, only operations performed downstream from points (d.) and (e.) are represented in the flow chart illustrated in FIG. 3B.

A negative port lookup is performed to determine whether other ports {Pj, Pk, . . . }—different from the port P1—of the server 150a (or 150b) that are expected to be closed for connections from public IP addresses are in fact closed or open. In contrast, the port hookup described above is performed to determine whether the port P1 of the server 150a (or 150b) that is expected to be open for connections from public IP addresses is in fact open or closed.

Hence, at 350', although the request for port hookup received at 340 from the reachability server 130 only references port P1, the server 150a (or 150b) listens for connection requests transmitted from the subnet 135a (or 135b) of the reachability server 130 not only on the port P1, but also on the ports {Pj, Pk, . . . } different from the port P1—of the server 150a (or 150b) that are expected to be closed for connections from public IP addresses.

In the meantime, at 355, after the transmitting at 330 of the subnet 135a (or 135b), the reachability server 130 selects a port Pj different from the port P1—specified in the request for port lookup received at 320 from the server 150a (or 150b)—on which to perform negative port lookup. In some implementations, the port Pj is selected by the reachability server 130 from a set of ports corresponding to services that typically are intended to be available only to internal clients 15aa, 15ab, . . . (or 15ba, 15bb, . . . ). An example of such a service is a file sharing service, for instance.

At 360', the reachability server 130 transmits, over the public IP connection to the server 150a (or 150b), a request to connect at the selected port Pj. Here, the request to connect to the port Pj can be a SYN TCP packet and is transmitted to the server 150a (or 150b) from the subnet 135a (or 135b), as specified in the transmission performed at 330.

At this point, the server 150a (or 150b) verifies whether a request to connect at port Pj is received from the subnet 135a (or 135b) of the reachability server 130 within a predefined time interval $\Delta T_S$. Once again, the predefined time interval $\Delta T_S$ is measured from the time when the subnet 135a (or 135b) is received at 340 by the server 150a (or 150b).

If a result of verification is that a request to connect at the port Pj is not received by the server 150a (or 150b) from the subnet 135a (or 135b) of the reachability server 130 within the predefined time interval $\Delta T_S$, then, at 370, the server 150a (or 150b) determines that the port Pj is closed for connections from IP addresses, as intended. As such, a service to be provided only to internal clients 15aa, 15ab, . . . (or 15ba, 15bb, . . . ) at the port Pj of the server 150a (or 150b) is unavailable over public IP connections, as intended.

Else if the result of the verification is that the request to connect at the port Pj is received by the server 150a (or 150b) from the subnet 135a (or 135b) of the Teachability server 130 within the predefined time interval $\Delta T_S$, then, at 380', the server 150a (or 150b) determines that the port Pj is unintendenly open for connections from public IP addresses. As such, the service to be provided only to internal clients 15aa, 15ab, . . . (or 15ba, 15bb, . . . ) at the port Pj of the server 150a (or 150b) unintendenly is available over public IP connections. In this case, various corrective measures can be taken at the server 150a (150b), either automatically or through user intervention, to address the unintended service availability.

Referring again to FIG. 3A, note that while it is inferred, at 280, that the service provided at the port P1 of the server 150a (or 150b) is available over public IP connections because the port P1 has been verified to be open for communications from public IP addresses, further checks are needed to determine whether the service available at the open port P1 functions properly.

Checking Propriety of Available Services Using a Cloud-Based Infrastructure

Figure 4:
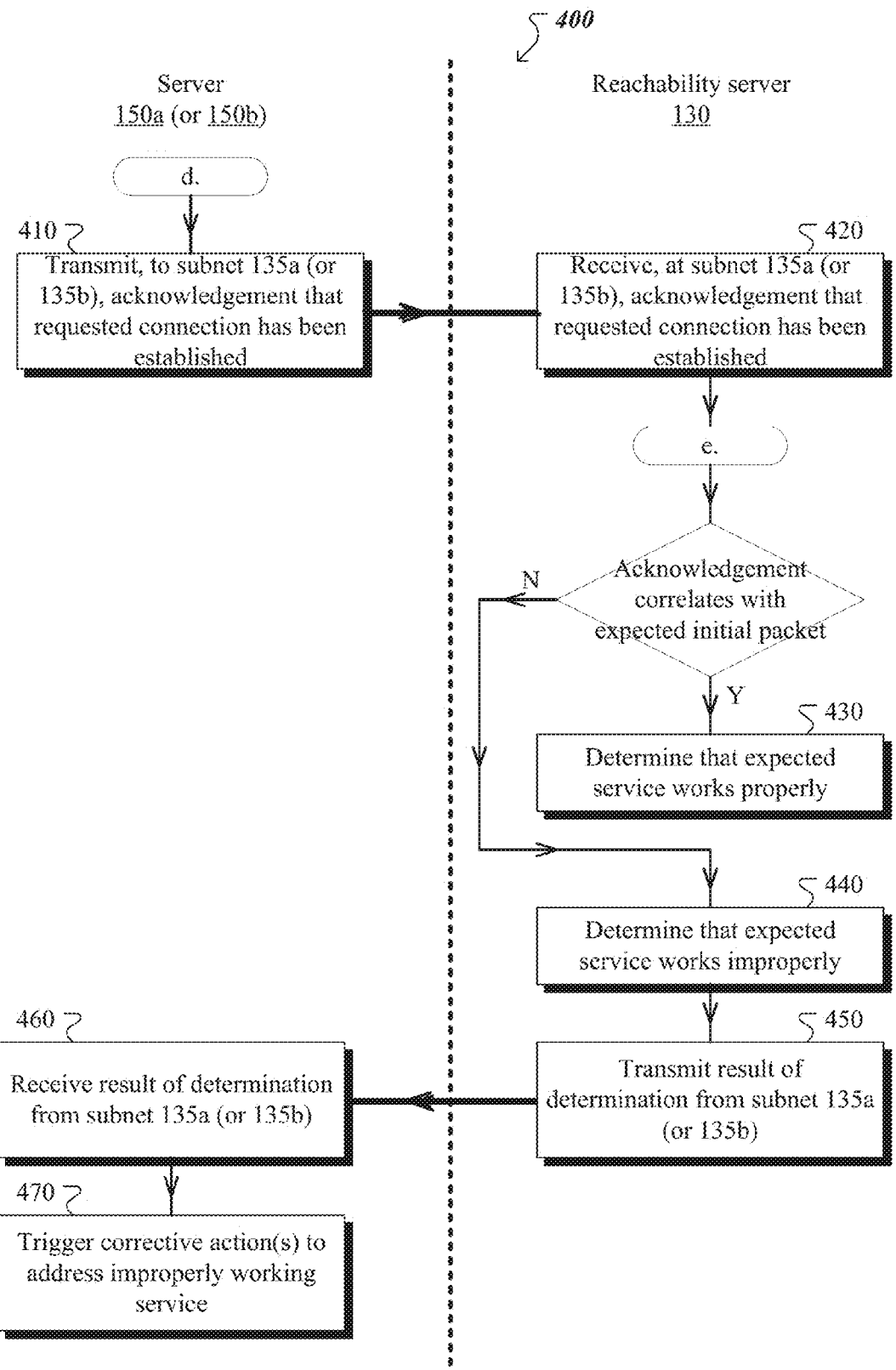
FIGS. 4 and 5 are flow charts of examples of processes for checking whether a service determined to be available functions properly.

FIG. 4 is a flow chart of an example of a process 400 for checking whether a service determined to be available functions properly. The process 400 can be implemented in the system 100 described above in connection with FIG. 1. For instance, some of the operations of the process 400 can be performed at a particular server 150a (or at another server 150b) and other operations of the process 400 can be performed at a reachability server 130 that is part of a computer system 120 of a cloud-based infrastructure for service checking. Further, the process 400 is performed in conjunction with the process 300 described above in connection with FIG. 3A. For instance, the process 400 is performed after determining at 380 that the port P1 of the server 150a (or 150b) is open and, hence, inferring that the service provided at the open port P1 is available over public IP connections.

Moreover, note that the process 400 is implemented when the request for port lookup received at 320 by the reachability serve 130 includes—in addition to the identifier of port P1—information relating to an initial packet expected to be received by an external client 20a, 20b, . . . of the server 150a (or 150b) as part of a proper functioning service, e.g., a web page tag, a security certificate, etc.

The process 400 starts at 410, where the server 150a (or 150b) transmits, to the subnet 135a (or 135b) of the reachability server 130, an acknowledgement (e.g., an ACK TCP packet) that the connection requested at 360 has been established.

At 420, the reachability server 130 receives, from the server 150a (or 150b) at the subnet 135a (or 135b), the acknowledgement that the connection requested at 360 has been established.

Here, the reachability server 130 verifies whether the received acknowledgment correlates with the initial packet expected to be received by an external client 20a, 20b, . . . of the server 150a (or 150b) as part of a proper functioning service. In some implementations, the reachability server 130 determines whether information parsed from the received ACK TCP packet matches at least a portion of the expected initial packet.

If a result of verification is that the received acknowledgment correlates with the expected initial packet, then, at 430, the reachability server 130 determines that the service that has been deemed available at 380 works properly. Note that, here, this positive result is not reported back to the server 150a (150b). Instead, the server 150a (or 150b) treats the checked service as working properly if no negative result is received from the reachability server 130.

Else, if the result of the verification is that the received acknowledgment does not correlate with the expected initial packet, then, at 440, the reachability server 130 determines that the service—that has been deemed available at 380— works improperly.

At 450, in response to the determining that the available service works improperly, the reachability server 130 transmits a result of the determination from the subnet 135a (or 135b) to the server 150a (or 150b). As noted above, only a negative result is reported back to the server 150a (150b).

At 460, the server 150a (or 150b) receives, from the subnet 135a (or 135b) of the reachability server 130, the result of the determination that the available service works improperly.

At 470, in response to receiving this negative result, the server 150a (or 150b) triggers, either automatically or through user intervention, corrective action(s) to address the determination that the available service works improperly.

Figure 5:
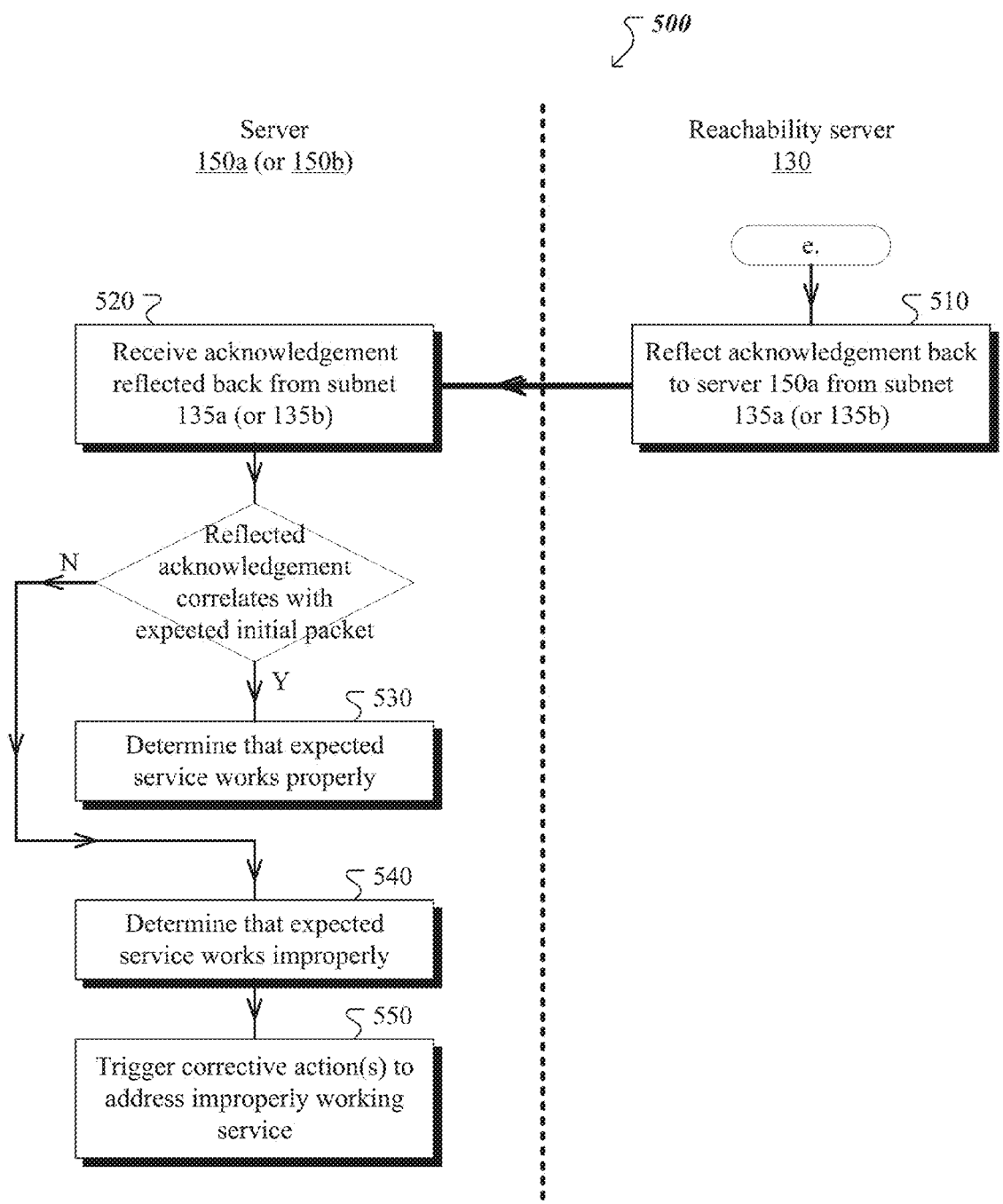

FIG. 5 is a flow chart of another example of a process 500 for checking whether a service determined to be available functions properly. The process 500 can be implemented in the system 100 described above in connection with FIG. 1. For instance, some of the operations of the process 500 can be performed at a particular server 150a (or at another server 150b) and other operations of the process 400 can be performed at a reachability server 130 that is part of a computer system 120 of a cloud-based infrastructure for service checking. Further, the process 500 is performed alternatively with respect to a portion of the process 400 described above in connection with FIG. 4. For instance, the process 500 is performed after the receiving at 420, from the server 150a (or 150b) at the subnet 135a (or 135b), of the acknowledgement that the connection requested at 360 has been established.

At 510, in response to receiving the acknowledgement that the connection requested at 260/269 or 360 has been established, the reachability server 130 reflects, from the subnet 135a (or 135b), the received acknowledgment back to the server 150a (or 150b). As noted above, the acknowledgement can be an ACK TCP packet.

At 520, the server 150a (or 150b) receives the acknowledgment reflected back from the subnet 135a (or 135b) of the reachability server 130.

Here, the server 150a (or 150b) verifies whether the reflected acknowledgment correlates with the initial packet expected to be received by an external client 20a, 20b, . . . of the server 150a (or 150b) as part of a proper functioning service. In some implementations, the server 150a (or 150b) determines whether information parsed from the reflected ACK TCP packet matches at least a portion of the expected initial packet.

If a result of verification is that the reflected acknowledgment correlates with the expected initial packet, then, at 530, the server 150a (or 150b) determines that the service that has been deemed available at 380 works properly.

Else, if the result of the verification is that the reflected acknowledgment does not correlate with the expected initial packet, then, at 540, the server 150a (or 150b) determines that the service—that has been deemed available at 380— works improperly.

At 550, in response to receiving this negative result, the server 150a (or 150b) triggers, either automatically or through user intervention, corrective action(s) to address the determination that the available service works improperly.

Example System Architecture

Figure 6:
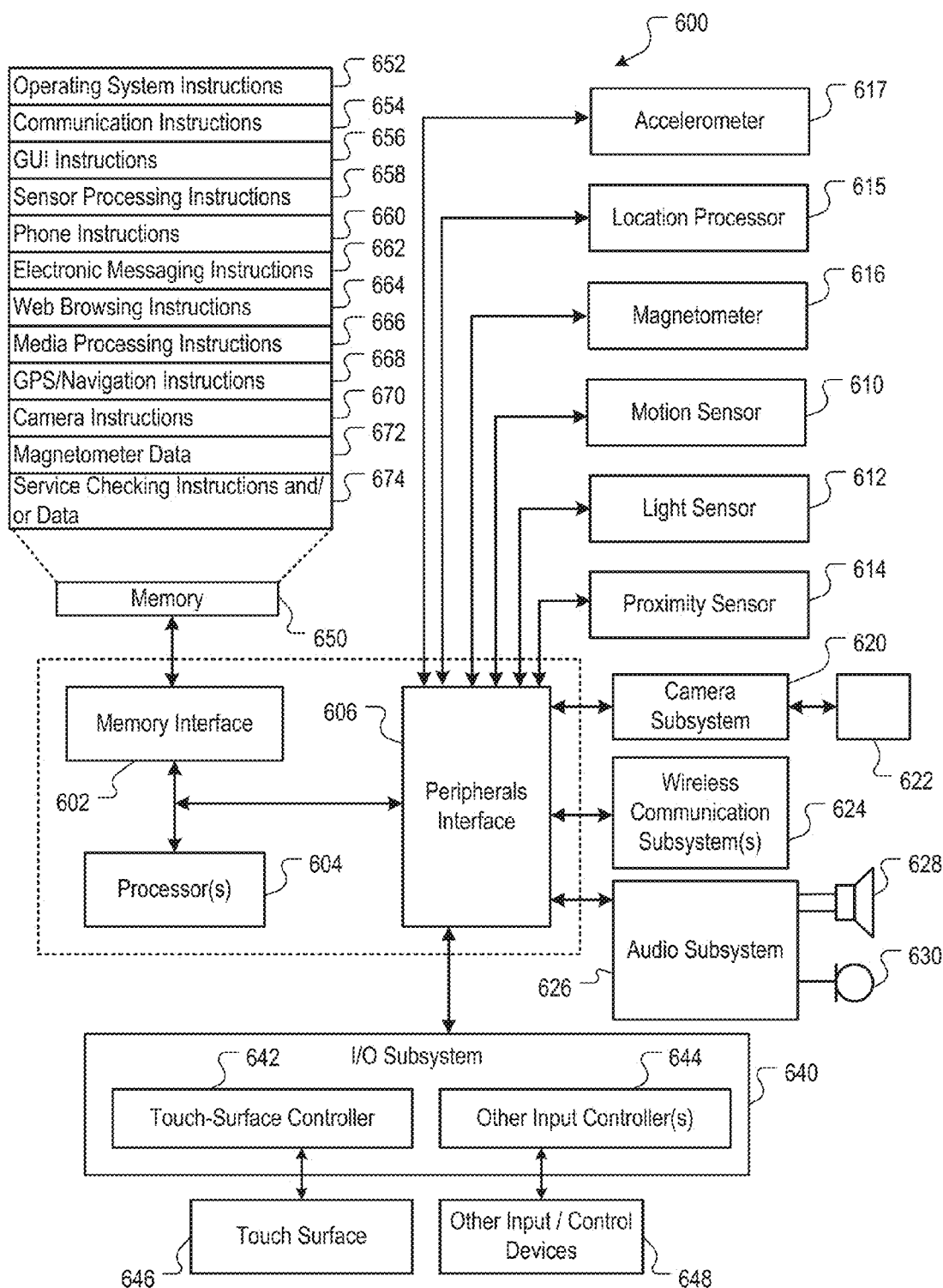
FIG. 6 is a block diagram of an example computing device that can implement the technologies described in connection with FIGS. 1-5.

FIG. 6 is a block diagram of an example computing device 600 that can implement the features and processes of FIGS. 1, 2A-2B, 3A-33, 4 and 5. The computing device 600 can include a memory interface 602, one or more data processors, image processors and/or central processing units 604, and a peripherals interface 606. The memory interface 602, the one or more processors 604 and/or the peripherals interface 606 can be separate components or can be integrated in one or more integrated circuits. The various components in the computing device 600 can be coupled by one or more communication buses or signal lines.

Sensors, devices, and subsystems can be coupled to the peripherals interface 606 to facilitate multiple functionalities. For example, a motion sensor 610, a light sensor 612, and a proximity sensor 614 can be coupled to the peripherals interface 606 to facilitate orientation, lighting, and proximity functions. Other sensors 616 can also be connected to the peripherals interface 606, such as a global navigation satellite system (GNSS) (e.g., GPS receiver), a temperature sensor, a biometric sensor, magnetometer or other sensing device, to facilitate related functionalities.

A camera subsystem 620 and an optical sensor 622, e.g., a charged coupled device (CCD) or a complementary metal-oxide semiconductor (CMOS) optical sensor, can be utilized to facilitate camera functions, such as recording photographs and video clips. The camera subsystem 620 and the optical sensor 622 can be used to collect images of a user to be used during authentication of a user, e.g., by performing facial recognition analysis.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which the computing device 600 is intended to operate. For example, the computing device 600 can include communication subsystems 624 designed to operate over a GSM network, a GPRS network, an EDGE network, a Wi-Fi or WiMax network, and a Bluetooth™ network. In particular, the wireless communication subsystems 624 can include hosting protocols such that the device 100 can be configured as abuse station for other wireless devices.

An audio subsystem 626 can be coupled to a speaker 628 and a microphone 630 to facilitate voice-enabled functions, such as speaker recognition, voice replication, digital recording, and telephony functions. The audio subsystem 626 can be configured to facilitate processing voice commands, voice printing and voice authentication, for example.

The I/O subsystem 640 can include a touch-surface controller 642 and/or other input controller(s) 644. The touch-surface controller 642 can be coupled to a touch surface 646. The touch surface 646 and touch-surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 646.

The other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of the speaker 628 and/or the microphone 630.

In one implementation, a pressing of the button for a first duration can disengage a lock of the touch surface 646; and a pressing of the button for a second duration that is longer than the first duration can turn power to the computing device 600 on or off. Pressing the button for a third duration can activate a voice control, or voice command, module that enables the user to speak commands into the microphone 630 to cause the device to execute the spoken command. The user can customize a functionality of one or more of the buttons. The touch surface 646 can, for example, also be used to implement virtual or soft buttons and/or a keyboard.

In some implementations, the computing device 600 can present recorded audio and/or video files, such as MP3, AAC, and MPEG files. In some implementations, the computing device 600 can include the functionality of an MP3 player, such as an iPod™.

The memory interface 602 can be coupled to memory 650. The memory 650 can include high-speed random access memory and/or non-volatile memory, such as one or more magnetic disk storage devices, one or more optical storage devices, and/or flash memory (e.g., NAND, NOR). The memory 650 can store an operating system 652, such as Darwin, RTXC, LINUX, UNIX, OS X, WINDOWS, or an embedded operating system such as VxWorks.

The operating system 652 can include instructions for handling basic system services and for performing hardware dependent tasks. In some implementations, the operating system 652 can be a kernel (e.g., UNIX kernel). In some implementations, the operating system 652 can include instructions for performing dynamic adjustment of the mobile device based on user activity. For example, operating system 652 can implement aspects of the system 100 described above in connection with FIG. 1, and/or aspects of the processes 200, 260', 300, 300', 400 and/or 500 described above in connection with FIGS. 2A-2B, 3A-3B, 4 and 5.

The memory 650 can also store communication instructions 654 to facilitate communicating with one or more additional devices, one or more computers and/or one or more servers. The memory 650 can include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS and navigation-related processes and instructions; and/or camera instructions 670 to facilitate camera-related processes and functions.

The memory 650 can also store other software instructions 670, such as web video instructions to facilitate web video-related processes and functions; and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively.

The memory 650 can store software instructions 674 to facilitate processes and functions for service checking, as described with reference to FIGS. 2A-2B, 3A-3B, 4 and 5.

Each of the above identified instructions and applications can correspond to a set of instructions for performing one or more functions described above. These instructions need not be implemented as separate software programs, procedures, or modules. The memory 650 can include additional instructions or fewer instructions. Furthermore, various functions of the computing device 600 can be implemented in hardware and/or in software, including in one or more signal processing and/or application specific integrated circuits.

Implementations of the subject matter and the functional operations described in this specification can be configured in digital electronic circuitry, in tangibly-embodied computer software or firmware, in computer hardware, including the structures disclosed in this specification and their structural equivalents, or in combinations of one or more of them. Implementations of the subject matter described in this specification can be configured as one or more computer programs, i.e., one or more modules of computer program instructions encoded on a tangible nonvolatile program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be configured on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be configured in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be configured in combination in a single implementation. Conversely, various features that are described in the context of a single implementation can also be configured in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
   a first computer system configured to run a first server, the first server to provide a first service over public Internet Protocol (IP) connections; and
   a second computer system configured to run a second server,
   wherein the first server transmits, over public IP connections, a request for the second server to check whether a first port of the first server, at which the first service is to be provided over public IP connections, is open,
   wherein, responsive to receipt of the request for the second server to check whether the first port of the first server is open, the second server provides, to the first server over public IP connections, a range of public IP addresses from one of which the second server is to subsequently connect to the first service, then transmits, from one of the range of public IP addresses to the first port of the first server, a request for connection to the first service, and wherein, upon receipt by the first server of the range of public IP addresses provided by the second server, the first server starts listening for the request to connect to the first service from one of the range of public IP addresses, and either determines that the first port of the first server is open if the request for connection to the first service is received at the first port from one of the range of public IP addresses within a predetermined time interval, the predetermined time interval being counted from receipt by the first server of the range of public IP addresses from the second server, the determination that the first port of the first server is open being performed without transmitting, by the first server over public IP connections to the second server, an acknowledgment that the request for connection to the first service transmitted by the second server was received at the first port of the first server, or determines that the first port of the first server is closed if the request to connect to the first service is not received at the first port from one of the range of public IP addresses within the predetermined time interval.

2. The system of claim 1, wherein
transmissions over public IP connections between the first and second servers are performed in accordance with a transmission control protocol (TCP), and
the request to connect to the first service is transmitted as a SYN TCP packet.

3. The system of claim 1, wherein the range of public IP addresses comprises a subnet associated with the second server.

4. The system of claim 3, wherein the range of public IP addresses comprises a particular IP address associated with the second server.

5. The system of claim 1, wherein the request is repeatedly transmitted by the first server over public IP connections to the second server.

6. The system of claim 5, wherein a frequency of transmissions of the request is less than a predetermined frequency.

7. The system of claim 5, wherein the first server stops repetition of transmissions of the request in response to input from a user of the first computer system.

8. The system of claim 1, wherein
the second server transmits, from one of the range of public IP addresses to a second port of the first server, a request for connection to a second service, the second service to be provided by the first server at the second port over private IP connections, and
the first server determines whether
the second port of the first server is open based on whether the request for connection to the second service is received at the second port from one of the range of public IP addresses within the predetermined time interval, and
the second service is unintendedly available over public IP connections based on whether the second port of the first server is open.

9. The system of claim 8, wherein the second server selects the second port of the first server from a set of predefined ports specified by the first server.

10. The system of claim 8, wherein the second port of the first server is selected by the second server from a set of ports aggregated by the second server based on trends over previous requests from the first server and/or from other servers similar to the first server.

11. The system of claim 1, wherein
the request further comprises information relating to an initial data packet to be transmitted from the first service,
responsive to receipt of the request for connecting to the first service at the first port from one of the range of public IP addresses, the first server transmits, over public IP connections to the second server, an acknowledgement indicating that connection with the first service at the first port has been established,
the second server determines whether the first service provided over public IP connections at the first port functions properly based on whether the acknowledgement received from the first server correlates with the initial data packet to be transmitted from the first service.

12. The system of claim 11, wherein, responsive to determining that the first service provided over public IP connections at the first port functions improperly, the second server notifies the first server that the first service provided over public IP connections at the first port functions improperly.

13. The system of claim 1, wherein
the request further comprises information relating to an initial data packet to be transmitted from the first service,
responsive to receipt of the request for connecting to the first service at the first port from one of the range of public IP addresses, the first server transmits, over public IP connections to the second server, an acknowledgement indicating that connection with the first service at the first port has been established,
the second server returns back to the first port from one of the range of public IP addresses the received acknowledgement, and
the first server determines proper functionality of the first service over public IP connections at the first port based on whether the returned acknowledgement correlates with the initial data packet to be transmitted from the first service.

14. The system of claim 1, wherein the first server determines that the first service is
available over public IP connections in response to determination that the first port is opened, and
unavailable over public IP connections in response to determination that the first port is closed.

15. A method performed by a first server running on a first computer system, the method comprising:
transmitting, over public Internet Protocol (IP) connections to a second server running on a second computer system, a request for the second server to check whether a first port of the first server, at which a first service is to be provided over public IP connections, is open;
receiving, from the second server over public IP connections, in response to the request for the second server to check whether the first port of the first server is open, a range of public IP addresses from one of which the second server is to subsequently connect to the first service;

upon receipt of the range of public IP addresses from the second server,
  listening for a request for connecting to the first service from one of the range of public IP addresses; and either
  determining that the first port of the first server is open in response to receiving, at the first port from one of the range of public IP addresses within a predetermined time interval, a request for connecting to the first service, the predetermined time interval being counted from the receiving of the range of public IP addresses, wherein the determining that the first port of the first server is open is performed without transmitting, over public IP connections to the second server, an acknowledgment that the request for connection to the first service transmitted by the second server was received at the first port of the first server; or
  determining that the first port of the first server is closed in response to not receiving, at the first port from one of the range of public IP addresses, within the predetermined time interval, the request to connect to the first service.

16. The method of claim 15, wherein
transmissions over public IP connections between the first and second servers are performed in accordance with a transmission control protocol (TCP), and
the request to connect to the first service is transmitted as a SYN TCP packet.

17. The method of claim 15, wherein the range of public IP addresses comprises a subnet associated with the second server.

18. The method of claim 17, wherein the range of public IP addresses comprises a particular IP address associated with the second server.

19. The method of claim 15, further comprising repeatedly transmitting, over public IP connections to the second server, the request.

20. The method of claim 19, wherein a frequency of transmissions of the request is less than a predetermined frequency.

21. The method of claim 19, further comprising stopping the repeated transmissions of the request in response to input from a user of the first computer system.

22. The method of claim 15, further comprising:
  receiving, from one of the range of public IP addresses to a second port of the first server, a request for connection to a second service, the second service to be provided by the first server at the second port over private IP connections;
  determining whether the second port of the second server is open based on whether the request for connection to the second service is received at the second port from one of the range of public IP addresses within the predetermined time interval; and
  determining whether the second service is unintendedly available over public IP connections based on whether the second port of the first server is open.

23. The method of claim 15, wherein
the request further comprises information relating to an initial data packet to be transmitted from the first service,
the method further comprising:
  responsive to receipt of the request for connecting to the first service at the first port from one of the range of public IP addresses, transmitting, over public IP connections to the second server, an acknowledgement indicating that connection with the first service at the first port has been established;
  receiving, at the first port from one of the range of public IP addresses, the acknowledgement reflected by the second server; and
  determining proper functionality of the first service over public IP connections at the first port based on whether the reflected acknowledgement correlates with the initial data packet to be transmitted from the first service.

24. The method of claim 15, further comprising determining that the first service is
  available over public IP connections in response to the determining that the first port is opened, and
  unavailable over public IP connections in response to the determining that the first port is closed.

* * * * *